Figure 1:
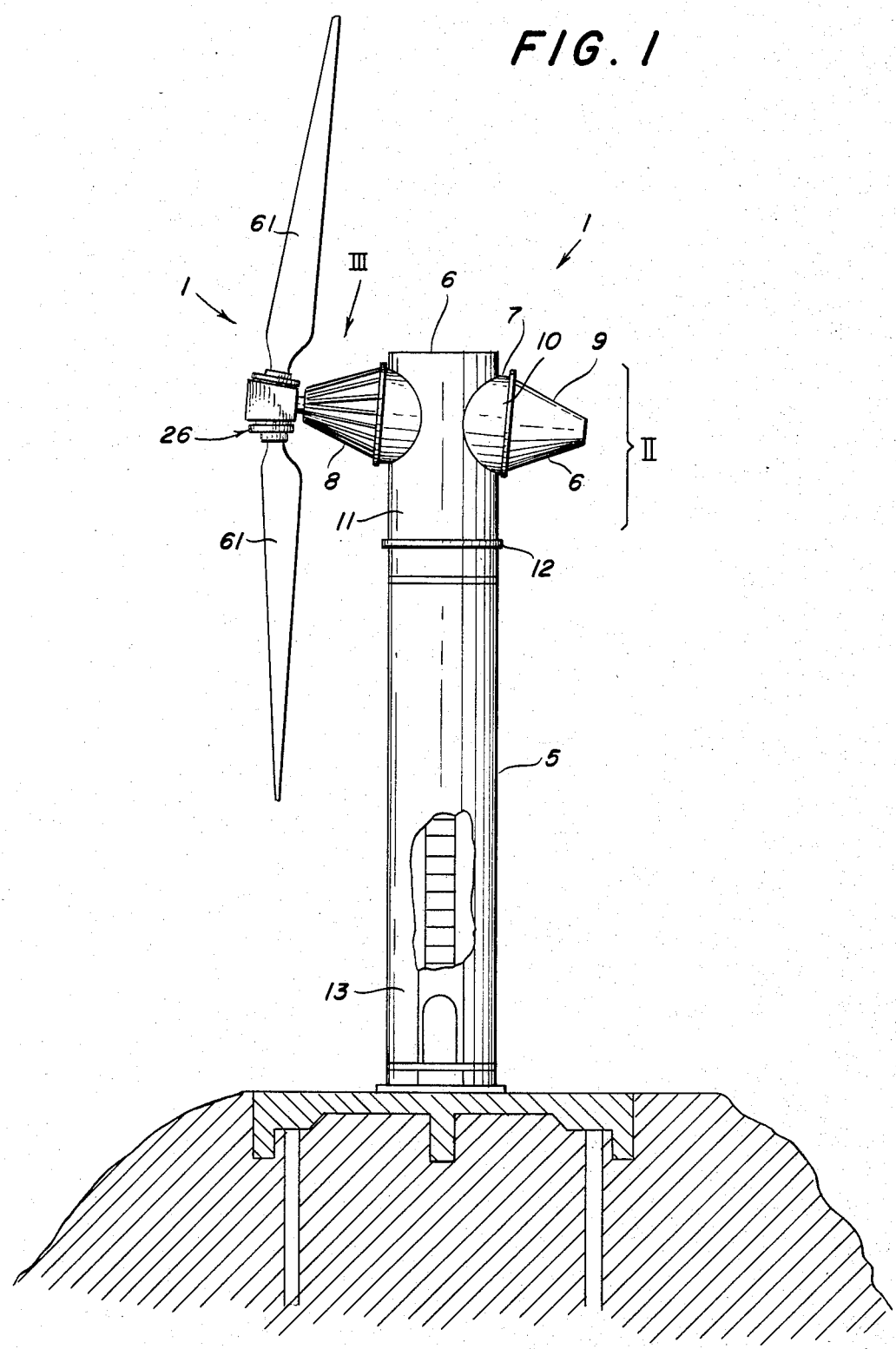

United States Patent [19]

van Degeer

[11] Patent Number: 4,527,072

[45] Date of Patent: Jul. 2, 1985

[54] DIVISIBLE CABIN FOR A WINDMILL

[75] Inventor: Peter M. van Degeer, Breukelen, Netherlands

[73] Assignee: FDO Technische Adviseurs B.V., Netherlands

[21] Appl. No.: 454,350

[22] Filed: Dec. 29, 1982

[30] Foreign Application Priority Data

Mar. 26, 1982 [NL] Netherlands ............. 8201283

[51] Int. Cl.³ ............................... F03D 11/04
[52] U.S. Cl. ................................ 290/55; 416/DIG. 6
[58] Field of Search ............ 290/44, 55; 416/DIG. 6, 416/244 A, 246, 11

[56] References Cited

U.S. PATENT DOCUMENTS

| 1,707,235 | 4/1929 | Sargent | 290/55 |
| 2,106,557 | 1/1938 | Putnam | 290/44 |
| 2,583,369 | 1/1982 | Fumagalli | |
| 2,832,895 | 4/1958 | Hütter | |

FOREIGN PATENT DOCUMENTS

| 2735298 | 2/1979 | Fed. Rep. of Germany | 416/142 B |
| 2823525 | 8/1979 | Fed. Rep. of Germany | |
| 2838238 | 3/1980 | Fed. Rep. of Germany | |

OTHER PUBLICATIONS

M.A.N. Forschen Planen Bauen, Apr. 1978 (Augsbur De) J. Feustel, "Nutzbare Energie aus Wind und Sonne" pp. 32-36, FIG. 9.

"Something in the Wind! Erda Thinks So", Theordore W. Black, Machine Design, May 1976.

Primary Examiner—Vit W. Miska
Assistant Examiner—Shelley Wade
Attorney, Agent, or Firm—Birch, Stewart, Kolasch & Birch

[57] ABSTRACT

A cabin for a windmill comprises inherently rigid, self-supporting, relatively disengageable parts. Cabin parts which occasionally have to be submitted for repair and/or maintenance work are removable from the windmill. During the repair and/or maintenance work a part similar to the removed part of the cabin can be easily installed.

7 Claims, 8 Drawing Figures

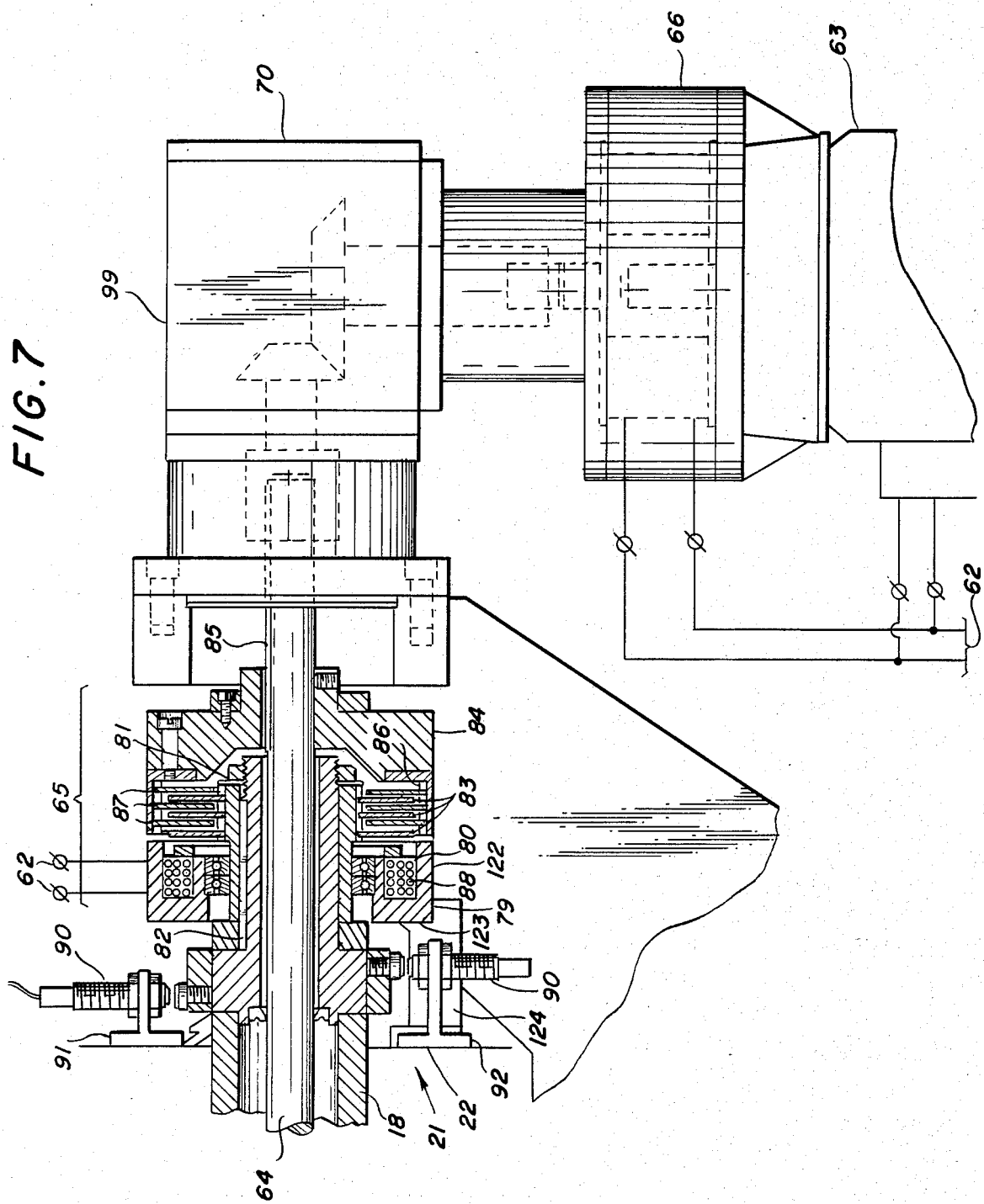

DIVISIBLE CABIN FOR A WINDMILL

The invention relates to a cabin for use in a windmill comprising a horizontal rotor shaft, particularly for the production of electricity, said cabin comprising an enclosed carrying structure rotatably fastened to the top end of a stationary mill shaft, on which the rotor shaft is journalled and mechanisms rotatably connected therewith and forming part of the system converting wind energy into electric energy and control-means arranged in the cabin. The known cabin structures comprise a carrying frame constructed in the form of an indivisible unit, which is bounded by wall plates. Such a cabin is accessible from within via the mill shaft for inspection and minor maintenance and repair work. If important repair and maintenance work has to be carried out, the entire cabin has to be removed from the mill shaft, since separate detachment, removal and remounting large, heavy components is not possible due to the limited accessibility. In order to obtain a satisfactory degree of accessibility to a plurality of windmills of a windmill park it is known to have a plurality of completely installed spare cabins on stock. The number of spare cabins required to be kept on stock is dependent on the probability of failure of the number of mechanisms arranged therein. Consequently, the number of spare cabins may be relatively large, which is expensive. Moreover, a cabin consisting of a carrying structure and wall sheets is relatively complicated and heavy so that the remaining part of the windmill must have a heavier and stronger construction, which also has a cost increasing effect.

The invention has for its object to obviate these drawbacks and to provide a cabin structure which is relatively simple and can be series manufactured. According to the invention this is achieved in that the cabin is built up from at least two inherently rigid or self-supporting, relatively disengageable portions, one of which is a detachable rotor cabin part.

The connection between the disengageable rotor cabin part and the stationary cabin part is preferably established by means of bolts that can be detached from the inside of the cabin so that the work conditions for the staff are improved and their safety is enhanced.

One of the cabin parts, the stationary cabin part, is preferably constructed in the form of a hollow cylinder, which is arranged transversely across or on the topmost mill shaft part, which is rotatable with respect to the stationary mill shaft part, and is rigidly secured thereto.

In the removable rotor cabin part are preferably arranged, apart from the rotor shaft, at least a gear wheel drive coupled with the rotor shaft and having an output shaft for driving the generator, a turning motor connected with said gear wheel drive and lubricating oil pump and, in the case of adjustable rotor blades, the associated blade setting mechanism.

The generator is preferably secured with the aid of a detachable centering flange construction to the stationary cabin part at such a place that the generator is removable and accessible from the outside of the cabin. The relevant opening at one end of the stationary cabin part is preferably provided with a screening hood detachable from within and removable from without.

This cabin build is rigid and has a low weight and provides in a simple manner the correct alignment of the generator with respect to the driving shaft of the gear wheel drive in the rotor cabin part. The generator is preferably coupled by means of a detachable lay shaft with the driving shaft.

The amount of mounting operations to be carried in the windmill for removing and disposing the rotor cabin part complete with the mechanisms arranged thereon, generator and screening hood is limited, whilst the work is uncomplicated. Said detachable parts are, of course, provided with gripping means such as, for example, tackling eyelets for a hoisting tool Therefore, replacement of said detachable parts by spare parts can be readily carried out.

Figure 2:
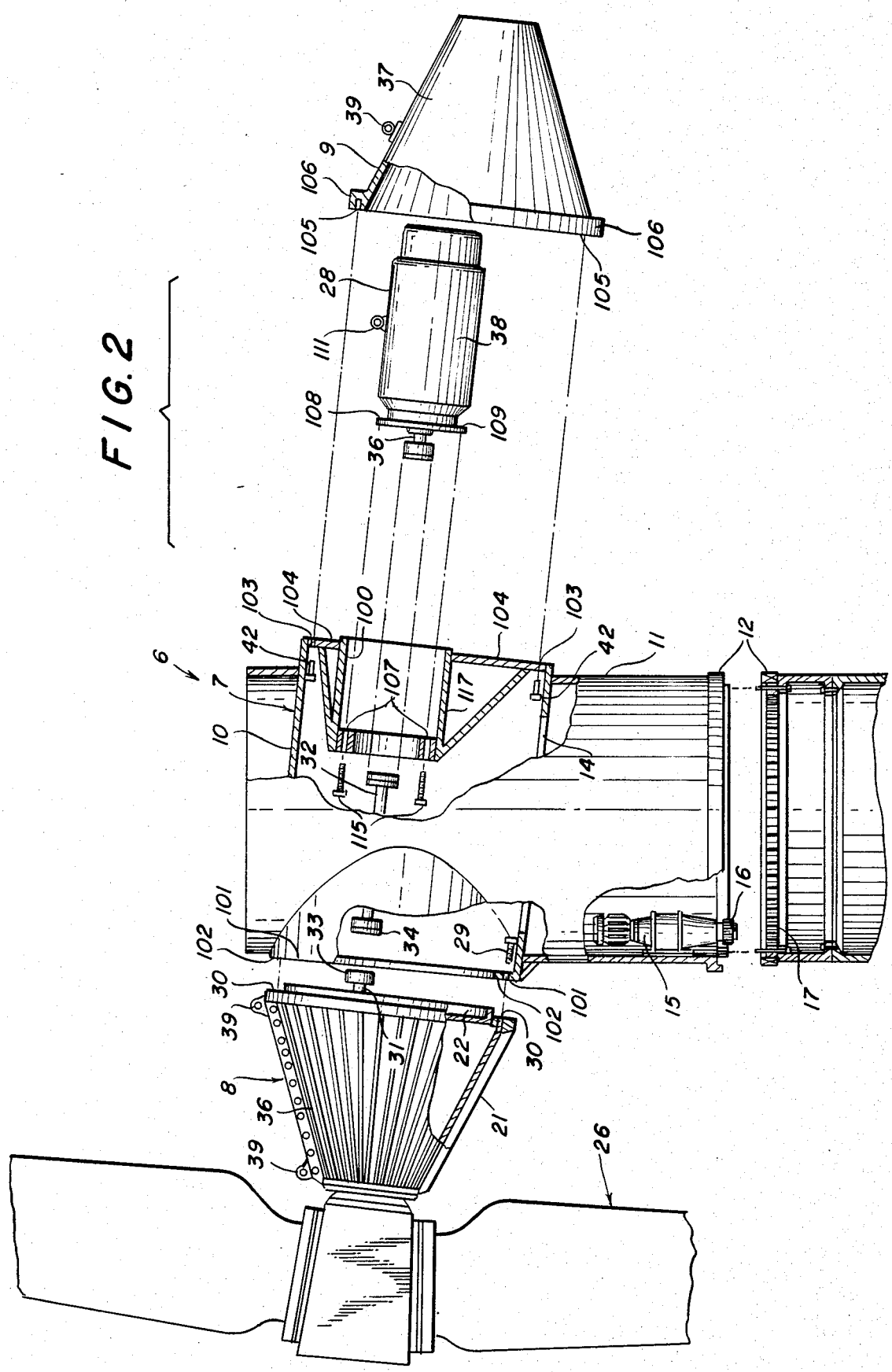
Figure 3:
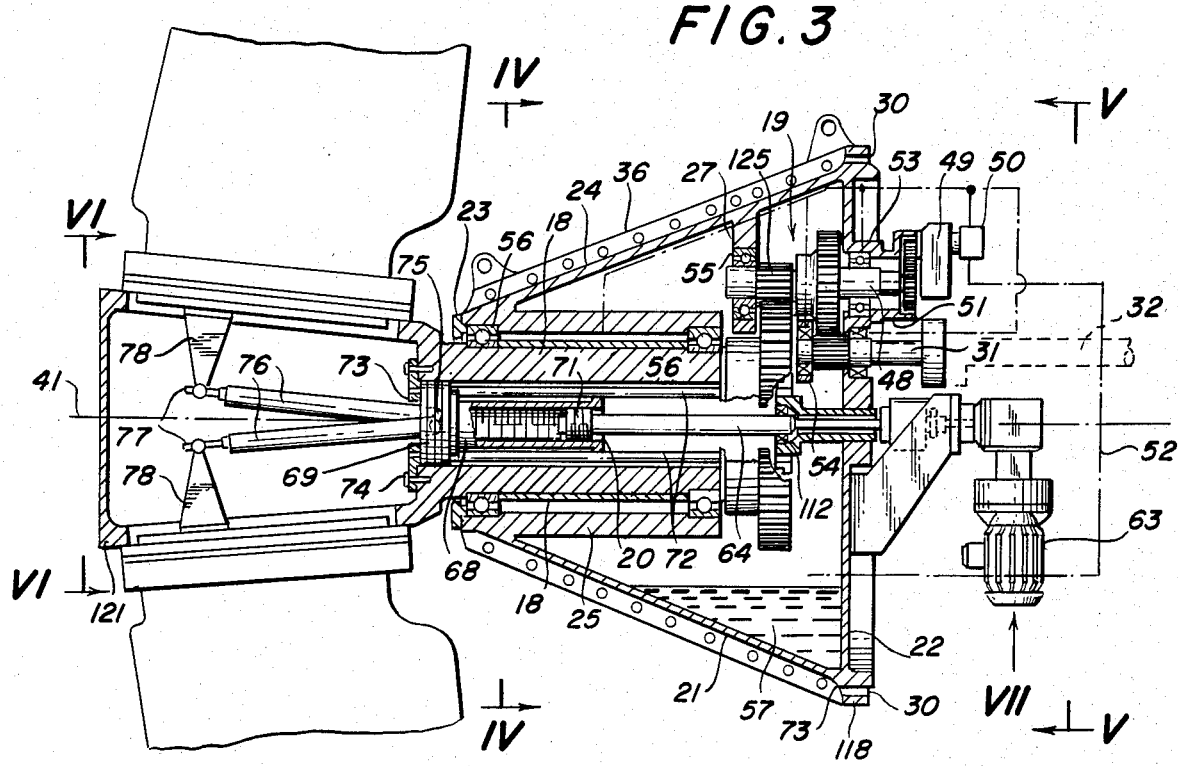
Figure 4:
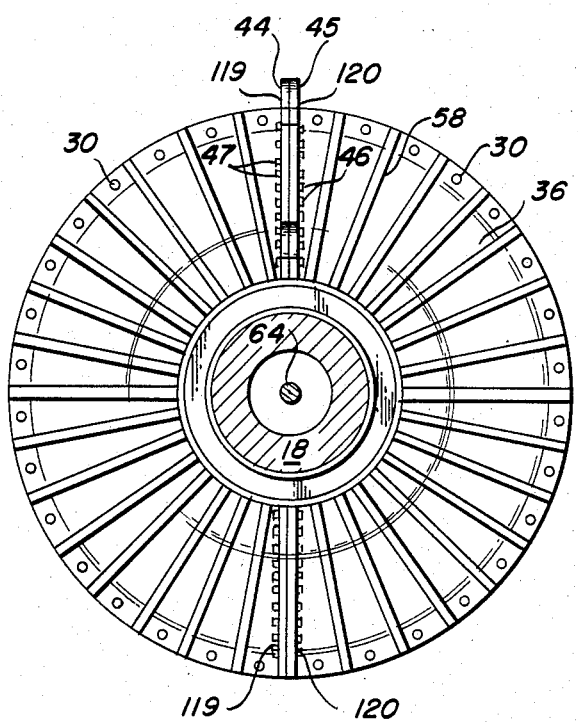
Figure 5:
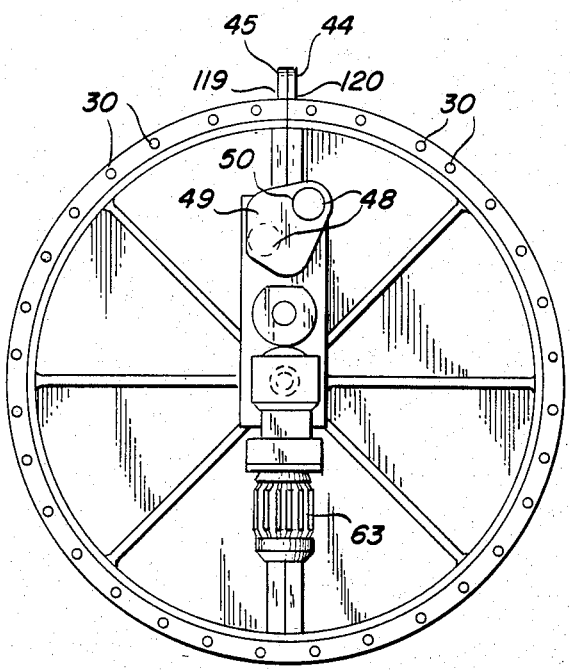
Figure 8:
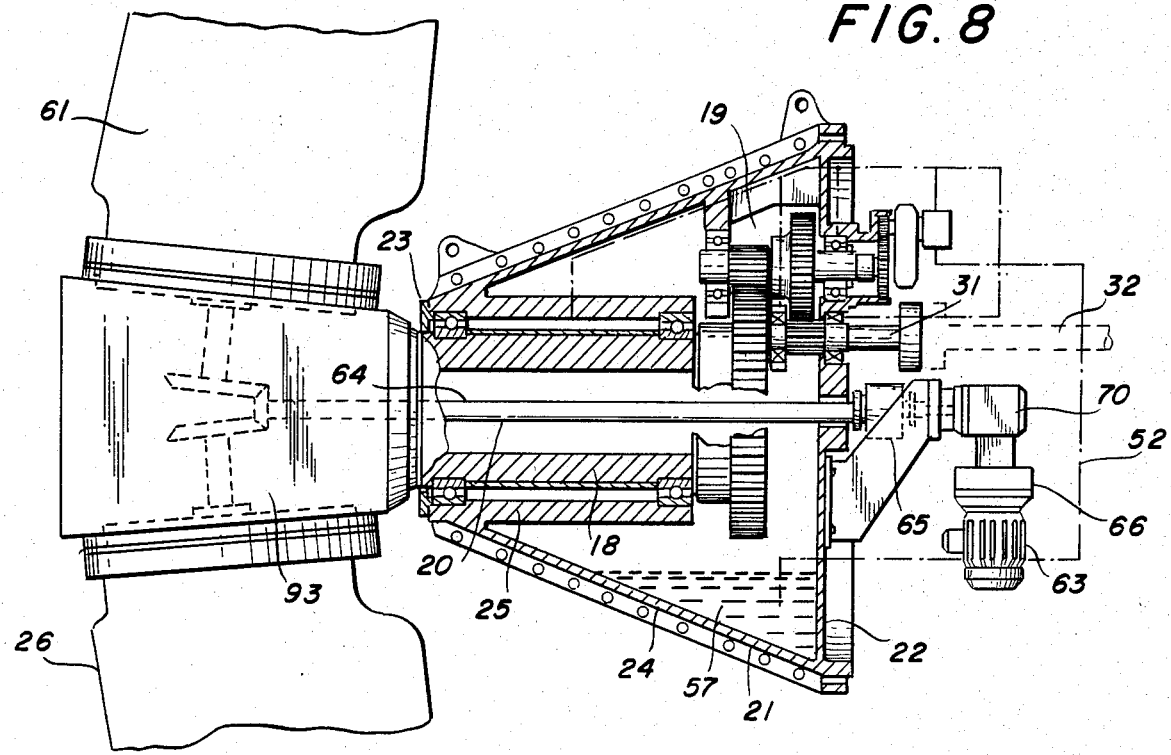
Figure 6:
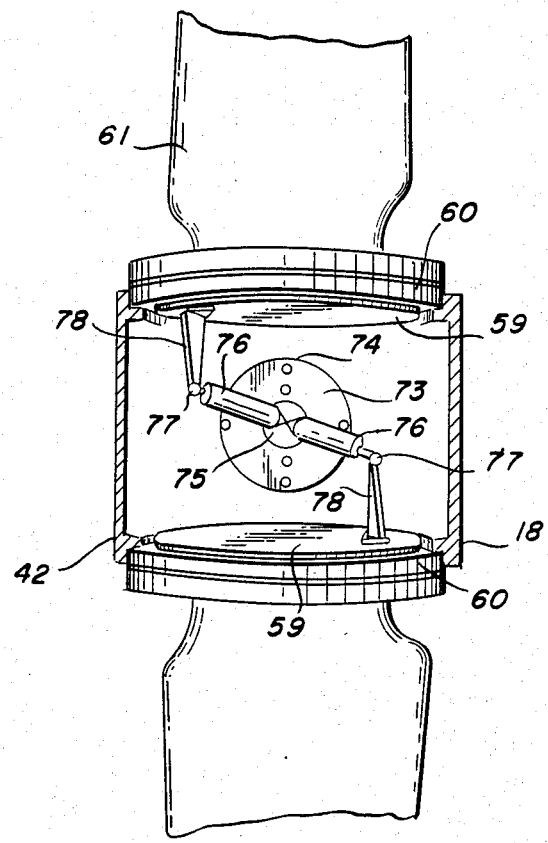

The aforesaid and further characteristics of the invention will become apparent from the following description with reference to the accompanying drawings in which:

FIG. 1 is a side elevation of a windmill embodying the invention,

FIG. 2 is an enlarged, fragmentary, exploded side elevation of a detail II of FIG. 1, FIG. 3 is an enlarged side elevation and partly a sectional view of detail III of FIG. 1, FIG. 4 is a sectional view taken on the line IV—IV in FIG. 3, FIG. 5 is an elevational view in the direction of the arrows V in FIG. 3, FIG. 6 is a sectional view taken on the line VI—VI in FIG. 3, FIG. 7 is an enlarged side elevation and partly a sectional view of detail VII of FIG. 3, and FIG. 8 is a side elevation corresponding to FIG. 3 of a variant of the mechanism shown in FIG. 3.

A windmill park may comprise a series of identical windmills 1 embodying the invention, which windmills 1 may be of the horizontal shaft type, and a hoisting implement adapted to travel along said windmills.

Each windmill 1 (FIG. 1) comprises a mill shaft 5 and a cabin 6 carried by the mill shaft 5.

The cabin 6 comprises a stationary cabin part 7 and two cabin parts 8 and 9 mounted on the stationary cabin part 7.

The stationary cabin part 7 has the shape of a horizontal cylinder 10, which is connected with and welded to a cylindrical topmost mill shaft part 11. By means of said mill shaft part 11 and a rotary crown 12 the stationary cabin part 7 is rotatably arranged on a stationary mill shaft 13 of the mill shaft 5.

For turning the cabin 6 at least one electric motor 15 is provided, which drives via a pinion 16 and a toothed crown 17 the cabin 6 for wheeling the same (FIG. 2). On the underside the stationary cabin part 7 has a manhole 14 so that the cabin 6 is accessible from the interior of the mill shaft 5. The cabin part 8 (FIG. 3), hereinafter termed rotor cabin part 8, comprises a number of mechanisms to wit: a rotor shaft 18, a gear wheel drive 19 and a blade setting mechanism 20. This rotor cabin part 8 comprises a cabinet 21 having a wall 22 fastened to the stationary cabin part 7, a free end 23 directed towards a mill rotor 26 and an intermediate, diverging jacket 24, a rotor bearing housing 25, in which a mill rotor 26 is journalled by means of its rotor shaft 18 and a gear wheel drive housing 27, in which the gear wheel drive 19 is journalled, which is driven by the rotor shaft 18.

The cabin part 9, hereinafter termed generator screening hood 9, has the shape of a truncated cone and surrounds a mechanism comprising a generator 28 journalled on the stationary cabin part 7.

An intermediate shaft 32 arranged in the stationary cabin part 7 connects by means of disengageable couplings 33 and 34 and output shaft 31 of the gear wheel drive 19 with a shaft 35 of the generator 28.

The rotor cabin part 8 with the mechanisms 18, 19 and 20 arranged therein and the stationary cabin part 7 are detachably interconnected with the aid of fastening means formed by bolts 29. The generator screening hood 9 surrounding the generator 28 is detachably connected to stationary cabin part 7. Fastening means formed by bolts 42 and generator 28 is journalled in stationary part 7 by a sliding fit in a carrying frame 100 and secured by bolts 115.

On an outer face 36, 37 of the rotor cabin part 8 and the generator screening hood 9 and on a generator housing 28 of the generator 28 are provided tackle fastening means formed by tackling eyelets 39 and 111. A hoisting cord of the hoisting implement can be fastened to the tackling eyelets 39 or 111 in order to remove the rotor cabin part 8, the generator screening hood 9 or the generator 28 from the stationary cabin part 7.

The bolts 29 fastening the rotor cabin part 8 to the stationary cabin part 7 can be manipulated from within the cabin 6 and are screwed through holes 101 in a centering flange 102 of the stationary cabin part 7 into tapped holes 30 of the wall 22 of the rotor cabin part 8.

The rotor cabin part 8 and the mechanisms 18, 19, 20 surrounded by the rotor cabin part 8 can be removed together by a single manipulation with the aid of the hoisting implement from the stationary cabin part 7, after in order of succession the hoisting cord of the hoisting implement is fastened to the eyelets 39 of the rotor cabin part 8, the coupling 33 is loosened from within the cabin 6 and the bolts 29 fastening the rotor cabin part 8 to the stationary cabin part 7 are unscrewed.

The bolts 42 fastening the generator screening hood 9 to the stationary cabin part 7 can be manipulated from within the cabin 6 and are screwed through holes 103 in a flange 104 of the stationary cabin part 7 into tapped holes 105 of a flange 106 of the generator screening hood 9. The generator screening hood 9 can be removed from the stationary cabin part 7, after in order of succession the hoisting cord of the hoisting implement is fastened to the eyelet 39 of the generator screening hood 9 and the bolts 42 fastening the generator screening hood 9 to the stationary cabin part 7 are unscrewed from within the cabin 6.

The bolts 115 fastening the generator 28 to the stationary cabin part 7 are screwed through holes 107 in a centering flange structure 117 of the carrying frame 100 of the stationary cabin part 7 into tapped holes 108 of a flange 109 of the generator 28.

When the generator screening hood 9 is removed from the stationary cabin part 7, the generator 28 can be removed with the aid of the hoisting implement from the stationary cabin part 7 after, in order of succession, the hoisting cord of the hoisting implement is fastened to the eyelet 111 of the generator housing 38, the coupling 34 is loosened from within the cabin 6, the bolts 115 are unscrewed from within the cabin 6 and the generator 28 is slipped out of the carrying frame 100 in which it is accommodated with sliding fit.

The rotor cabin part 8 and the mechanisms 18, 19, 20 surrounded by the rotor cabin part 8 constitute an integral unit which is detachably connected on the one hand with the stationary cabin part 7 on the other hand with one another. Furthermore the generator hood 9 and the mechanism 28 surrounded by the generator hood 9 are detachably connected each with the stationary cabin part 7 and with one another.

The rotor cabin part 8 of the cabin 6 of the windmill 1 comprises the cabinet 21, the rotor bearing housing 25 and the gear wheel drive housing 27. The rotor bearing housing 25 and the gear wheel drive housing 27 are accommodated in the cabinet 21, the diverging jacket 24 of which forms a wall 24 of the gear wheel drive housing 27 (FIG. 3). In a longitudinal plane including rotor axis 41 are undetachably interconnected parts of the diverging jacket 24, parts of the gear wheel drive housing 27 and parts of the rotor bearing housing 25 and are associated with one and the same monolith 43. The cabinet 21, the rotor bearing housing 25 and the gear wheel drive housing 27 constitute an integral unit. This integral unit is divisible in the plane of the rotor axis 41 into two monolithic parts 44 and 45 (FIGS. 4 and 5). The monolithic parts 44, 45 are fastened to one another by fastening means comprising bolts 46 and nuts 47.

By means of additional gear wheels 125 and auxiliary output shafts 48 auxiliary mechanisms, for example, a turning motor 49 and a lubricating oil pump 50 are coupled with the rotor shaft 18 by means of the gear wheel drive 19. A frame 51 for the auxiliary mechanisms 49 and 50 is detachably fastened to the wall 22 of the cabinet 21 of the rotor cabin part 8. The lubricating oil pump 50 supplied through oil ducts 52 the lubricating oil 57 to the bearings 53 tot 56 the oil being collected below in the cabinet 21. The outer face 36 of the diverging jacket 24 is provided with cooling vanes 58 for cooling the lubricating oil 57 contained in the cabinet 21.

The cooling vanes 58 provided on the outer face 36 of the diverging jacket 24 serve in addition as stiffening vanes. The cabin 6 is inherently rigid and thus self-supporting and derives the required rigidity from its shape.

The blade setting mechanism 20 for adjusting rotor blades 61 of the mill rotor 26, which is rotatably journalled by means of its rotor shaft 18 on the rotor cabin part 8 of the cabin 6 of the windmill 1 is passed through the hollow rotor shaft. The blade setting mechanism 20 comprises a rotation motor for example, an electric motor 63 fed from a source of energy 62 and setting means comprising a spindle shaft 64 coupling the electric motor 63 with the rotor blades 61.

The spindle shaft 64 is journalled by means of a bearing 112 in the hollow rotor shaft and is rigidly connected at one end with the output shaft of a reducing gear box on the electric motor 63. At the other end the spindle shaft is in engagement by means of a worm 71 with a gland 68, which is displaceable in an axial direction in the hollow rotor shaft 18 and guarded against rotation and which is furthermore connected through a rod system 69 with the consoles 78 on the collar 59 of the rotor blades 61 rotatably journalled in the rotor hub 121. Between the spindle shaft 64 and the rotor shaft 18 is arranged an electro-magnetic coupling 65 and on the shaft 67 of the driving motor 63 an electro-magnetic brake 66.

Setting of the rotor blades 16 occurs when the spindle shaft 64 has a speed of rotation differing from that of the rotor shaft in a manner such that, when the spindle shaft 64 rotates in the same direction more rapidly than the rotor shaft 18, the rotor blades 61 are adjusted away from the vane position and, when the spindle shaft 64 rotates more slowly, adjustment takes place towards the vane position. When during the operation of the windmill 1 no blade setting is needed, the spindle shaft 64 is fixedly coupled with the rotor shaft 18 by means of the electro-magnetic coupling 65, whilst the electro-magnetic brake 66 is not operative and the electric motor 63 is not energized.

If during operation the rotor blades 61 have to be adjusted, the electro-magnetic coupling 65 as well as the electro-magnetic brake 66 are inoperative and the electric motor 63 is energized in order to attain the number of revolutions required for the adjustment.

The electric motor 63 can be driven with at least two speeds, a high speed so that the spindle shaft 64 assumed a rotary speed equal to that of the rotor shaft 18 at the maximum permissible operative rotor speed and a low speed so that the spindle shaft 64 assumed a rotary speed equal to or lower than that of the rotor shaft 18 at the minimum operative rotor speed. Therefore, for causing a windmill 1 to attain the operative speed out of the rest position, in which the rotor blades 61 are in the vane position, the electric motor 63 has to be driven first with a low speed and subsequently with a high speed in order to attain an operative rotor speed lying between minimum and maximum. In order to reduce the maximum operative speed to the minimum operative speed the electric motor 63 has to be driven with the low speed. If the windmill 1 after having reached the minimum operative speed has to be set in the rest position, the manipulations described hereinafter are carried out for putting the windmill out of operation in an emergency case.

When due to a state of emergency the windmill 1 has to be put out of operation as soon as possible, this is performed with the blade setting mechanism 29 in accordance with the invention in the safest manner as follows:

The electro-magnetic coupling 65 is disengaged by obviating the electric power and the electro-magnetic brake 66 is caused to operate also by obviating the electric energization, whilst the electric energization of the electric motor 63 is also switched off. As a result the spindle shaft rotation is slowed down with respect to the rotor shaft rotation and the rotor blades 61 are adjusted towards the vane position so that the mill rotor 26 is aerodynamically braked, whilst for this adjustment no internal source of energy is required.

In the hollow rotor shaft 18 the pindle shaft 64 is coupled by means of a worm 71 with the gland 68, which is slidably journalled in the hollow rotor shaft 18 by means of guide rods 72 and is guarded against rotation with respect to the rotor shaft 18. The rotor shaft 18 is provided with an annular bumper 73, which is fastened by means of bolts 74 to the rotor shaft 18 and on which the guide rods 72 are arranged. By means of ball-and-socket joints 75 the gland 68 is coupled with the rod system 69. The rod system 69 comprises rods 76, which are connected on the one hand by means of ball-and-socket joints 75 with the gland 68 and on the other hand by means of ball-and-socket joints 77 with consoles 78 (FIG. 6). The console 78 is fastened to a collar 59 of the rotor blade 61, which is rotatably journalled by means of a rotary crown 60 at the free end 42 of the rotor shaft 18.

The electro-magnetic multiple disc clutch 65 comprises an annular electro-magnet 79 accommodated in an energization housing 122 and journalled by means of bearing 80 around a star wedge sleeve 81 (FIG. 7). The energization housing 122 is guarded against rotation with respect to the wall 22 of the rotor cabin part 8 and for this purpose the energization housing 122 has at least one recess 123 for a lug 124 fastened to the wall 22. The star wedge sleeve 81 is arranged around the rotor shaft 18 and guarded against rotation with respect to the rotor shaft 18 by means of a key 82. On the star wedge sleeve 81 are arranged axially slidable lamellae 83 guarded against rotation relative to the star wedge sleeve 81 and extending in a radial direction. The lamellae 83 are surrounded by a star wedge housing 84, which is arranged on the spindle shaft 64 and guarded against rotation relative to the spindle shaft by means of a key 85. On the inner face 86 of the star wedge housing 84 are arranged axially slidable lamellae 87 guarded against rotation relative to the star wedge housing 84 and extending in spaces between the lamellae 83 and the star wedge housing 84. When the electro-magnet 79 is energized, a magnetic field is induced in the coil 88 so that the lamallae 87 of the star wedge housing 84 and the lamellae 83 of the star wedge sleeve 81 shift in an axial direction up to a stationary inner face 86 of the star wedge housing 84 so that the lamellae 87 and 84 engage one another as a result of which the spindle shaft 64 is coupled with the rotor shaft 18.

The electric motor 63 and the electro-magnetic brake 66 acting on the shaft 67 of the electric motor 63 are fastened to a frame 89 by means of the reduction gearing housing 99 of the reduction gearing 70. The frame 89 is releasably connected with the built-on wall 22 of the cabinet 21 of the rotor cabin part 8.

A control-system for actuating the blade setting mechanism 20 includes feelers 90 accessing the rotary speed of the rotor shaft 18 and being connected by fastening means 91, 92 with the wall 22 of the cabinet 21 of the rotor cabin part 8. The control-signals required for the blade setting mechanism originate from the control-system which will not be discussed herein.

In dependence on the signals from the control-system the blades 61 are adjusted by means of the blade setting mechanism 20 towards and, respectively, away from the vane position.

When the electric power is lacking due to disturbance, the electro-magnetic clutch 65 is released so that the spindle shaft 64 is disconnected from the rotor shaft 18, whilst the electro-magnetic brake 66 on the electric motor shaft 67 of the electric motor 63 is actuated so that the rotation of the spindle shaft 64, which is coupled by means of the reduction gearing 70 with the electric motor shaft 67, is slowed down relatively to the rotor shaft 18 and the rotor blades 61 are adjusted towards the vane position without using the electric motor 63 and the mill rotor 26 comes to a standstill.

The variant of the blade setting mechanism 20 shown in FIG. 8 is identical to the blade setting mechanism 20 of FIG. 3, the difference being that the spindle shaft 64 is coupled through a bevel gearing 93 with the rotor blades 61.

The rotor cabin part 8 embodying the invention, with which the cabinet 21, the rotor bearing housing 25 and the gear wheel drive housing 27 constitute an integral unit, can be removed together with the mechanisms 18, 19, 20 surrounded by the rotor cabin part 8 as an unit from the stationary cabin part 7 of the cabin 6. In the case of a windmill park the rotor cabin part 8 to be removed for maintenance or repair purposes can be replaced by a spare rotor cabin part 8, after which the maintenance and repair operations can be carried in a revision shop.

To the generator 28 applies the same as to the rotor cabin part 8.

What is claimed is:

1. A cabin for use in a windmill which has a horizontal rotor shaft and generator means coupled to said horizontal shaft for the generation of electricity, comprising:
- an enclosed carrying structure rotatably supported on a top end of a stationary mill shaft;
- said enclosed carrying structure comprising a first rigid, self-supporting cabin part, and second and third rigid self-supporting cabin parts independently separable from said first cabin part;
- said second cabin part comprising means for supporting a rotor externally thereof and means for supporting at least a portion of said horizontal shaft and gears for driving said generator means internally thereof, said second cabin part, said rotor, said gears and said horizontal shaft portion being separable as a unit from said first cabin part;
- said first cabin part comprising means for detachably housing said generator means, and said third cabin part comprising a cover for a portion of said generator means, said third cabin part being separable from said first cabin part for facilitating removal of said generator means from said first cabin part.

2. A cabin for use in a windmill as in claim 1, wherein said second cabin part further supports rotor blade setting means internally thereof, said blade setting means being jointly separable from said first cabin part with said rotor, said horizontal shaft portion, said gears and said second cabin part.

3. A cabin for use in a windmill as in claim 1, further comprising means for permitting entry by a service person into the interior of said first cabin part for facilitating removal of said second or third cabin part from said first cabin part.

4. A cabin for use in a windmill as in claim 3, wherein said means for permitting entry comprises a passage interior of said stationary mill shaft and in communication with the interior of said first cabin part.

5. A cabin for use in a windmill as in claim 1, wherein said first cabin part comprises a centering flange structure and said generator means is releasably fastened in said centering flange structure of the first cabin part.

6. A cabin for use in a windmill as in claim 1, wherein said first cabin part includes a first flange for mounting the second cabin part and a second flange for mounting said third cabin part.

7. A cabin for use in a windmill as in claim 1, wherein said first cabin part also accommodates a blade turning motor and a lubricating oil pump.

* * * * *